United States Patent [19]

Fuerter et al.

[11] Patent Number: 4,613,217

[45] Date of Patent: Sep. 23, 1986

[54] SPECTACLE LENS HAVING ASTIGMATIC POWER

[75] Inventors: Gerhard Fuerter, Ellwangen; Hans Lahres, Aalen, both of Fed. Rep. of Germany

[73] Assignee: Carl-Zeiss-Stiftung, Heidenheim/Brenz, Oberkochen, Fed. Rep. of Germany

[21] Appl. No.: 573,580

[22] Filed: Jan. 25, 1984

Related U.S. Application Data

[63] Continuation-in-part of Ser. No. 258,996, Apr. 30, 1981, abandoned.

[30] Foreign Application Priority Data

May 2, 1980 [DE] Fed. Rep. of Germany ....... 3016936

[51] Int. Cl.[4] ............................................. G02C 7/02
[52] U.S. Cl. .................................... 351/176; 351/159; 351/177
[58] Field of Search ........................ 351/159, 176, 177

[56] References Cited

U.S. PATENT DOCUMENTS

| | | | |
|---|---|---|---|
| 3,722,986 | 3/1973 | Tagnon | 351/177 X |
| 3,960,442 | 6/1976 | Davis et al. | 351/176 |
| 4,300,817 | 11/1981 | Betensky | 350/432 X |
| 4,310,225 | 1/1982 | Davis | 351/176 |

FOREIGN PATENT DOCUMENTS

| | | | |
|---|---|---|---|
| 1805561 | 5/1969 | Fed. Rep. of Germany ... | 351/177 X |
| 2002474 | 7/1970 | Fed. Rep. of Germany ...... | 351/169 |

OTHER PUBLICATIONS

Rigler, A. K. et al., "Spline Functions: An Alternative Representation of Aspheric Surfaces; *Applied Optics;* vol. 10, No. 7; pp. 1648–1651; Jul. 1971.

*Primary Examiner*—John K. Corbin
*Assistant Examiner*—Scott J. Sugarman
*Attorney, Agent, or Firm*—Hopgood, Calimafde, Kalil, Blaustein & Judlowe

[57] ABSTRACT

The invention contemplates an astigmatic-power lens having at least one lens surface which differs from spherical or toric shape and which is characterized by the fact that, for each elemental region of said lens surface, the principal curvatures and the principal curvature-directions are so selected that the astigmatism of the spectacle lens and of the eye to be corrected are optimally adapted as to direction and extent.

13 Claims, 10 Drawing Figures

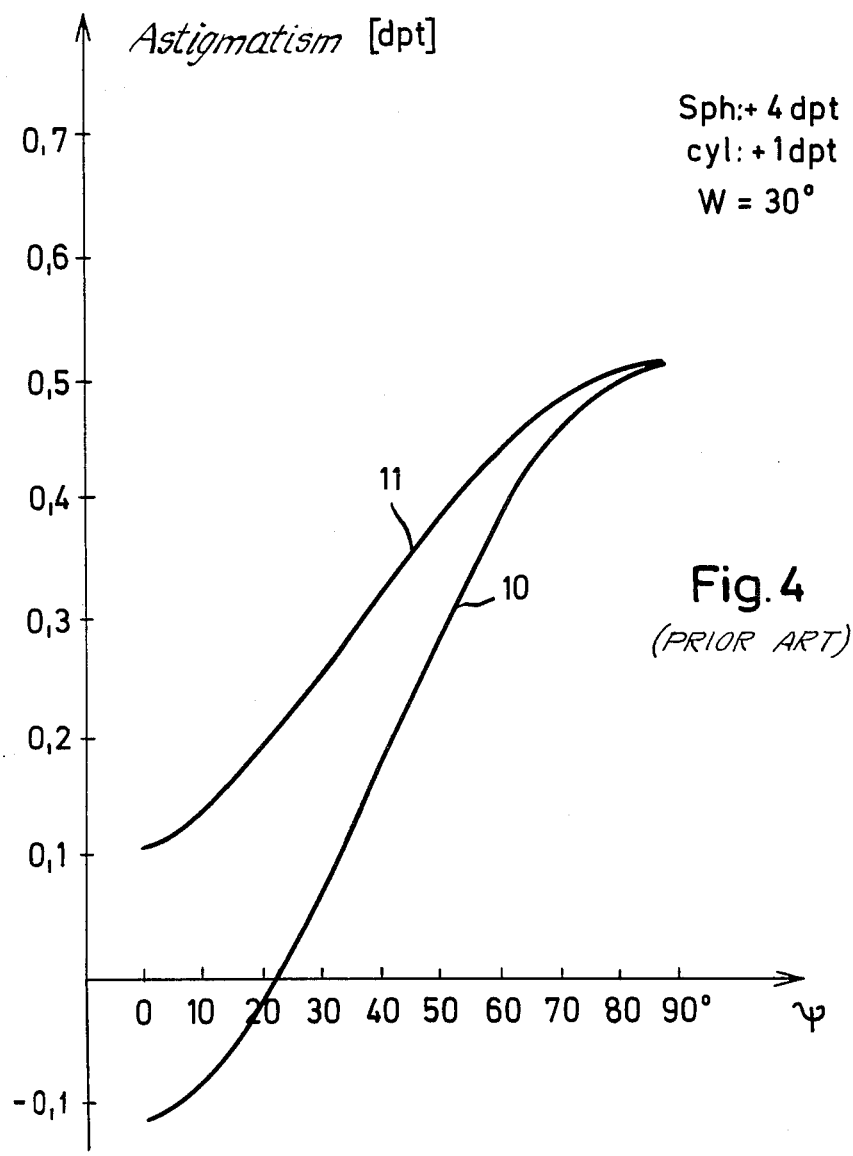

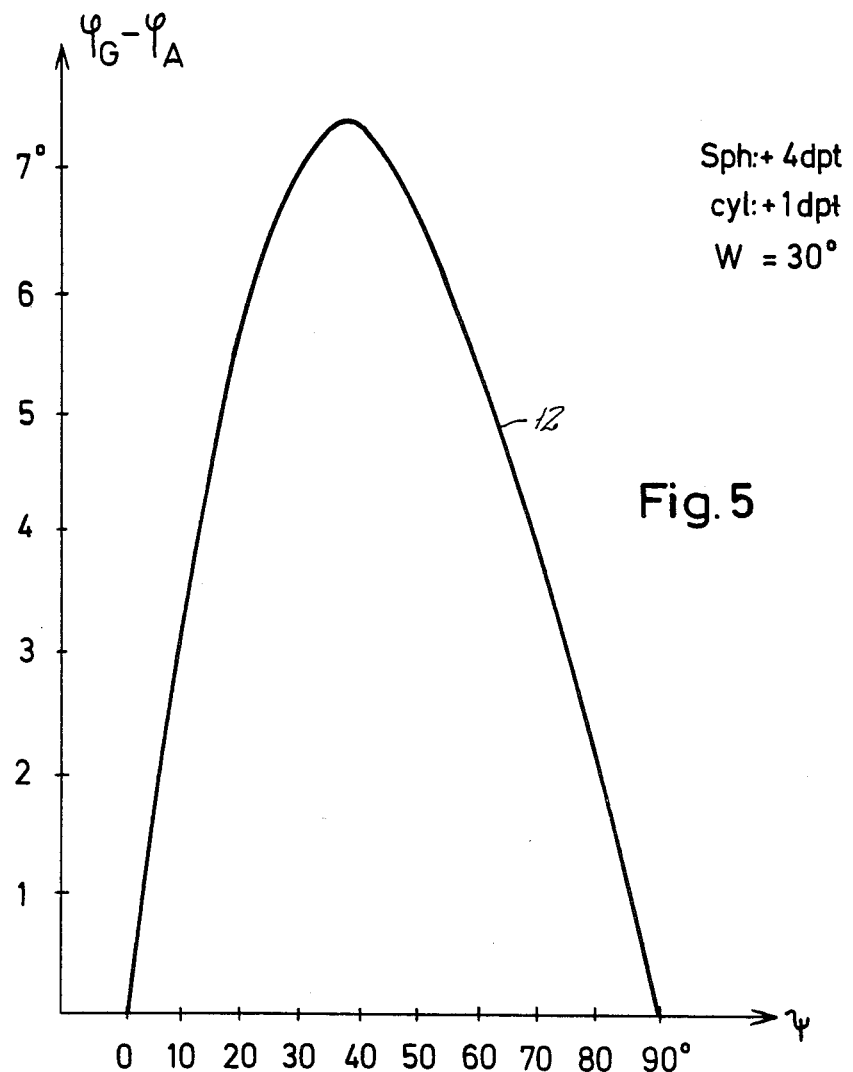

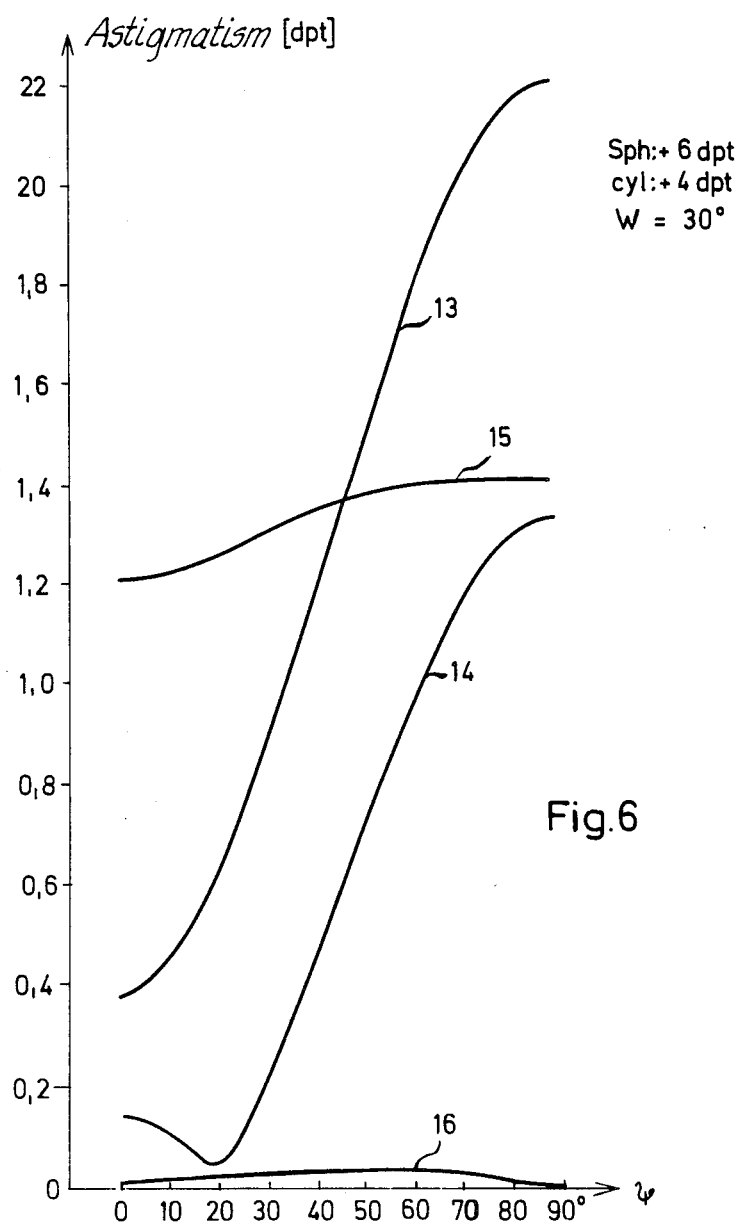

FIG. 8.
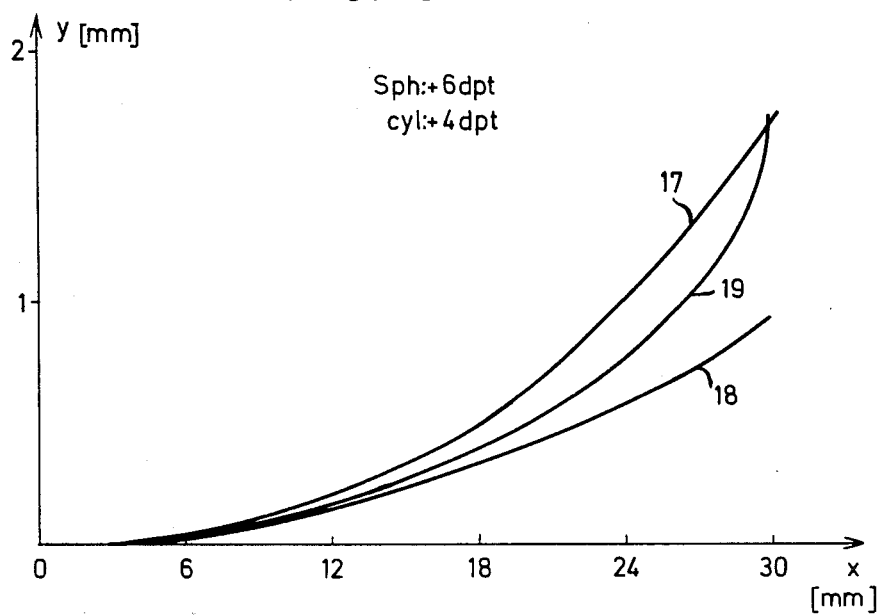
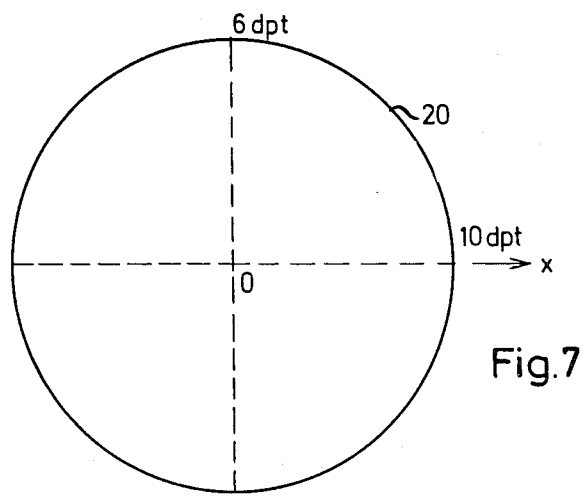
Fig. 7

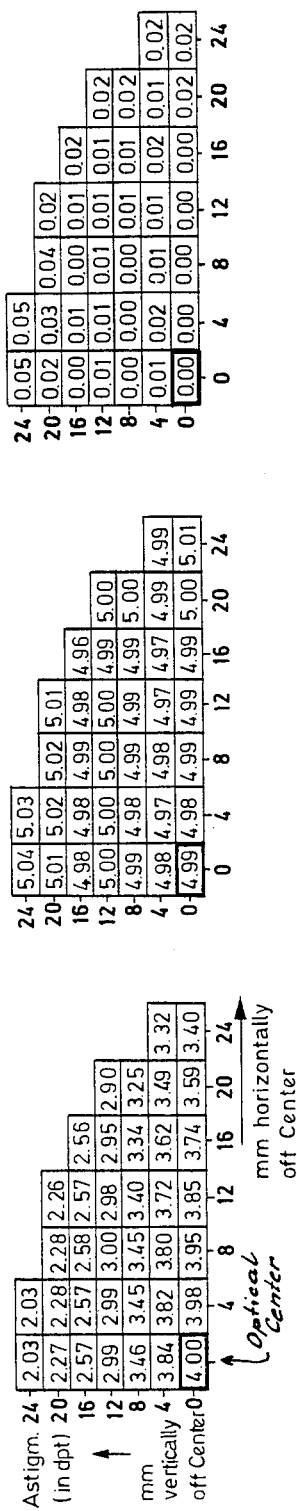
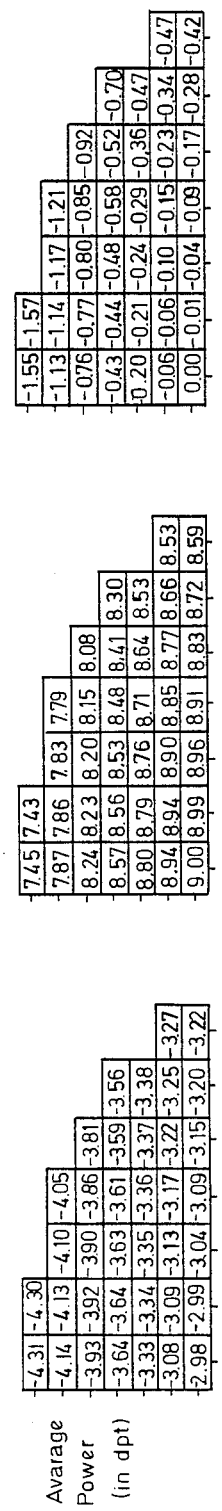
Fig. 9
Sph: +6dpt
Cyl: +4dpt

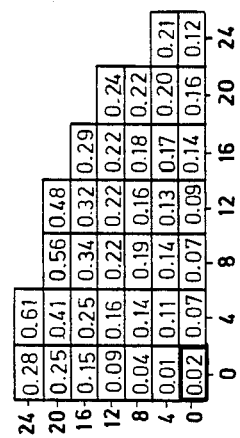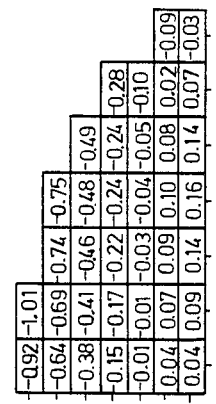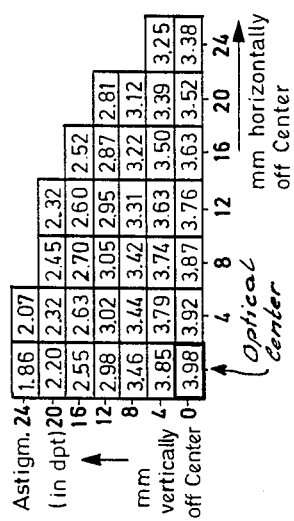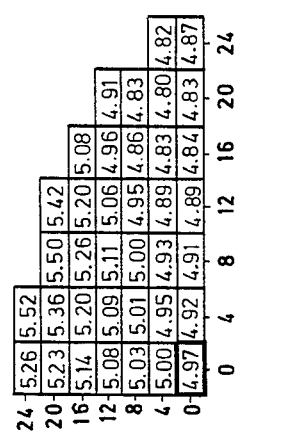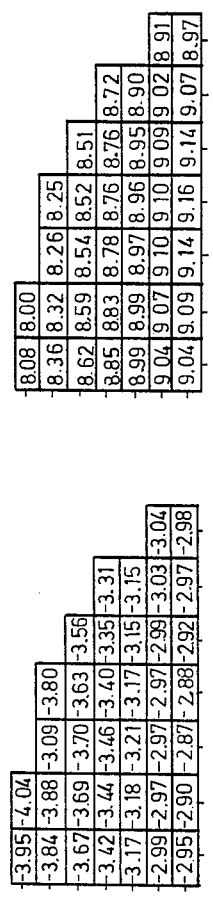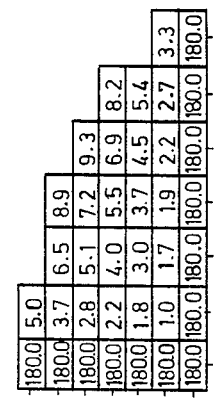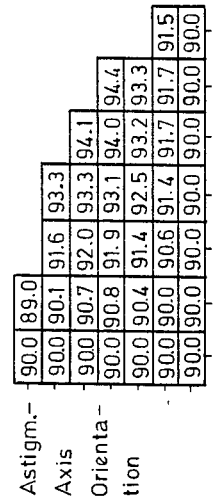
Fig. 10
Sph.: +6 dpt
Cyl.: +4 dpt

SPECTACLE LENS HAVING ASTIGMATIC POWER

BACKGROUND OF THE INVENTION

The present invention relates to a spectacle lens having astigmatic power, and this application is a continuation-in-part of copending application Ser. No. 258,996, filed Apr. 30, 1981, now abandoned.

In spectacle lenses while serve to correct astigmatism of the eye, at least one surface has a cylindrical power, i.e. it does not have rotational symmetry about the optical axis. In general, the lens surface having cylindrical power is developed as a toric surface. Such a toric surface is produced by rotation of a circular arc about an axis which does not extend through the center of this circular arc; it therefore has different radii of curvature in its two principal section.

Such toric surfaces, particularly in the case of spectacle lenses of high vertex dioptric power, cannot satisfy all requirements, i.e. such toric surfaces cannot sufficiently correct defective vision of the eye for all viewing directions.

For the case of a spectacle lens with strongly positive vertex dioptric power, as used in particular by aphakic persons, i.e. persons who have been operated on for a cataract, German Offenlegungsschrift No. 1,805,561 teaches the development of one lens surface in such manner that all planes passing through the optical axis of the lens form with said surface curves of intersection which have approximately the shape of part of an ellipse. In this connection, the surface in the entire region between the principal meridians is interpolated purely as a function of azimuth, using data of the curves of intersection of said two meridians. But such a surface has too few degrees of freedom for optimum correction of the entire surface.

BRIEF STATEMENT OF THE INVENTION

The object of the present invention is to provide a spectacle lens of such astigmatic power that the astigmatic effect of the spectacle lens optimally cancels out the astigmatic effect of the eye over the entire surface of the lens. In this connection, "optimally" means that a small but tolerable amount of incompletely corrected astigmatism may still exist.

The invention achieves this object by providing a spectacle lens having at least one lens surface which differs from spherical or toric shape and which is characterized by the fact that, for each elemental region of said lens surface, the principal curvatures and the principal curvature-directions are so selected that the astimatism of the spectacle lens and of the eye to be corrected are optimally adapted as to direction and extent.

A thus-developed lens surface will be referred to herein as a "deformed" lens surface.

With a deformed lens surface of the present invention, there is no mathematical relationship between the intersection curves which are formed with said surface by planes passing through the optical axis of the lens.

Due to the fact that the deformed lens surface is formed of individually calculated small regions, it can be seen that so many degrees of freedom are available that optimal correction can be obtained for each possible location of the instantaneous axis of eye-viewing incidence.

With the spectacle lens of the invention for every viewing movement of the eye, i.e. for all sight directions, the axis orientation of the astigmatism produced by the lens and that required by the eye for correction substantially agree; the same is true also with regard to the magnitude of the astigmatism.

The location of astigmatism of an eye can be determined for each visual angle of said eye in accordance with Listing's rule, which states: "If the eye changes its direction of view, the position of the eyeball in the new position of view is in such relationship to the initial position of view as through a simple rotation had occured about the rotational center of the eye in the plane determined by the initial and final directions of view". Having ascertained this distribution of the astigmatism of a particular eye, astigmatism and focusing error are then calculated as residual error of the lens-eye system, referred to the corneal vertex and for such distance of the optical center of rotation of the eye from the rear-lens vertex as takes into account the customary distance from the lens to the cornea and the positional relationship of the optical center of rotation of the eye on the ametropia of the eye.

Listing's rule can be considered a good approximation to the statistical average. But it will, of course, be understood that the invention can also be practiced using laws which more precisely describe the statistical conditions, when making a calculation of the surface.

The calculation of the spectacle lens can be so performed as to obtain a residual astigmatism of substantially zero. There remains a small focusing error, i.e. the point of beam recombination does not lie precisely on the retina of the eye. In the case of spectacle lenses of positive vertex power, the focusing error is as a rule negative, i.e. the locus of best beam recombination lies behind the retina. The focusing error is, for example for a spectacle lens with corrective power of sph=+6 dept, cyl=+4 dpt, less than 1 dpt, at a visual angle $w=30°$. The visual angle w being the angle of instantaneous sighting-axis orientation of the eye with respect to the central or horizontal axis of the spectacle lens, as will be more clear from later discussion. Such a small error will, in general, be sufficiently compensated by accommodation.

It may also be advantageous to allow for the combined lens-eye system an astigmatic error of a small amount which increases with the visual angle, since investigations of the modulation-transfer function have shown that optimum contrast transfer may exist with small amounts of the astigmatism. Furthermore, a small residual astigmatism has a favorable effect on focusing error, which is of particular advantage in the case of spectacle lenses for aphakic persons, and in spectacle lenses with stronger negative vertex power.

It is particularly advantageous to develop a deformed surface of the invention using the known mathematical spline analysis or technique in such manner that the developed surface is twice continuously differentiable at each point of the surface. This condition assures continuity of residual astigmatism and focusing error, whatever the shifting displacement of the eye.

More specifically, the permitted residual astigmatism of the lens-eye system should advantageously satisfy the following quality formula:

For all visual angles of $w \geq 10°$ up to the edge of the lens, and for all positions of the vision lines characterized by the angle $\Psi$ on the vision cone $w=$ constant between 0° and 360°:

| residual astigmatism | $(w, \psi) \leq$ $(0.125 + 0.00025 \times w^2) \times \min(1; 2z/3) \times (1 + |s|)/8.75$ where:
  w is the visual angle, in degrees, calculated from the central axis of the spectacle lens;
  z is the cylinder effect, in diopters; and
  s is the spherical equivalent (i.e.

$$\left( \text{i.e. sphere} + \frac{\text{cylinder}}{2} \right).$$

The factor min (1; 2z/3) means that there is to be inserted the value of 1 or 2z/3, whichever is less at the time, e.g. the value is 1, for all values of $z \geq 3/2$ dpt.

As already mentioned, distance of the eye from the object viewed is part of the calculation of the deformed lens surface. This object distance can be the same over the entire field of view and, as a matter of fact, it may be finite or infinite, in which case, a single-focus lens results. The object distance may also depend on viewing direction, so that all types of multi-focus lenses, and thus also progressive lenses, can be calculated, i.e. lenses the power of which varies throughout the accommodation-convergence path of the eye. The deformed surface can be developed as at least part of the front or rear surface of a single-focus or multi-focus lens or of a progressive lens, and as a fusion surface of a multi-focus lens.

So many degrees of freedom are available for calculation of spectacle lenses of the invention that quality of the correction does not depend on the selection of the lens bending, i.e. the radii of curvature of the lens surfaces. The bending can therefore be selected according to cosmetic and/or grinding or manufacturing aspects. It is also possible to calculate the spectacle lens of the invention in such a way, that the lens is insensitive to decentering errors arising from a wrong insertion into a spectacle frame, and is also insensitive with respect to varying cornea-vertex distances.

More specifically, the method of the invention contemplates embodying astigmatic correction in a spectacle lens having an outer surface and an inner surface, the correction being to reduce to sustantially zero the residual astigmatism of the lens and of a particular astigmatic eye for which lens correction is required. The method comprises individual calculation of data as to principal curvature and as to principal-curvature direction for at least one point in every region of viewing-axis incidence with the inner surface, wherein the individual data calculation in each case includes considerations of (1) a first astigmatic component due to oblique incidence of related incoming light on the outer surface, (b) a second astigmatism component due to oblique incidence of light transmitted through the lens to the inner surface and emergent from the inner surface in the viewing-axis direction, and (c) a third astigmatism component due to a local cylindrical component of curvature in at least one of the lens surfaces. The data for each point are calculated such that the sum of these astigmatism components is substantially equal in magnitude but opposite in sign with respect to the particular astigmatism of the eye. Finally, a spline analysis is performed to developed an ultimate aspheric profile for the involved at least one surface in such manner as to satisfy the calculated data for each point, the thus-developed surface being twice continuously differentiable at each point in the surface. Whereupon, the thus-calculated and mathematically developed surface may be used as the mathematical input to physically generate the calculated surface in a machining operation.

The foregoing outline of method steps, wherein substantially zero residual astigmatic lens/eye accommodation is contemplated, will be understood to apply more particularly to single lens correction of eyes which have sufficient focal accommodation (e.g. young persons). On the other hand, for those whose eyes have little or no focal accommodation (e.g. older people), the residual lens/eye astigmatism may be reduced to an acceptable level (e.g. not to exceed the empirical relationship stated above), whereby the residual average power is held within tolerable limits for all viewing directions.

With a deformed lens surface developed in accordance with the invention, none of the curves of intersection which are formed by intersection with planes through the optical axis satisfies the laws of a conical section. Thus, the new spectacle lens differs from all known spectacle lenses having astigmatic power.

The invention encompasses all spectacle lenses which satisfy the quality formula indicated above and which do this only because at least one lens surface is deformed in accordance with the features to be described below.

The manufacture of spectacle lenses of the invention is possible by means of numerically controlled machine tools, known and available on the market. It is also possible to produce spectacle lenses of the invention from organic material, using known molding techniques.

DETAILED DESCRIPTION OF THE INVENTION

The invention will now be described in detail with reference to the accompanying drawings, in which:

FIG. 4 is a graph of astigmatism as a function of the angle $\Psi$ comparatively displaying the characteristic of a typical spectacle lens of prior art (having a toric rear surface) and of the spectacle lens/eye system;

FIG. 5 is a graph to show the differences between the angular position of the astigmatism axes of the spectacle lens and the eye for the example of FIG. 4, as a function of the angle $\Psi$;

FIG. 6 is another graph to comparatively show residual astigmatism of lens/eye systems as a function of the angle $\Psi$, for a preselected visual angle, for known toric spectacle lenses, and for a spectacle lens of the invention, all lens/eye systems involving the same severely astigmatic situation to be corrected;

FIG. 7 is a view in front elevation of a lens of the invention;

FIG. 8 is a graph, plotting with 10:1 exaggeration, the surface coordinates of a half-section through a principal meridian, to illustrate the lens of FIG. 7, in comparison with prior art lenses;

FIG. 9 is a first charted tabulation of optical power distribution throughout a lens of the invention, respectively (a) for an astigmatic-correcting aspheric lens surface, (b) for a spectacle lens embodying said lens surface and (c) for the combined effect of the astigmatic eye which the lens is designed to correct, the correction having been optimized for a spectacle lens intended for a young person, i.e. having relatively great focal accommodation; and FIG. 10 is a second charted tabulation, similar to that of FIG. 9 but optimized for an older person having little or no focal-accommodation.

Figure 1:
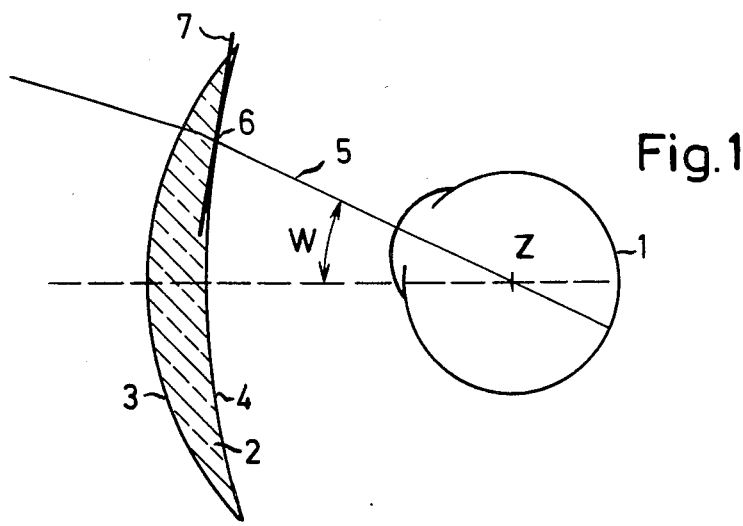
FIG. 1 is a simplified vertical section through a spectacle-lens/eye system to illustrate an off-center visual angle and its related surface-intersection point.

In FIG. 1, an eye is shown diagrammatically, and the optical center of rotation of eye 1 is designated Z. A spectacle lens 2, whose object-side surface 3 is spherical, and whose eye-side surface 4 is toric or deformed, is disposed in front of the eye 1. The spectacle lens 2 has an astigmatic power which is intended to compensate for the astigmatic defect of the eye 1. The eye 1 views in a direction, for which one component is defined by the visual angle w between the line of sight 5 and the horizontal. For further definition of the direction of view, the angle $\Psi$ (FIG. 2) provides a second component, determining angular location of the viewing line on the viewing cone w=constant. Upon viewing to the right, i.e. in the aspect seen in FIG. 2, $\Psi=0°$ by definition, and upon viewing upward $\Psi=90°$.

Figure 2:
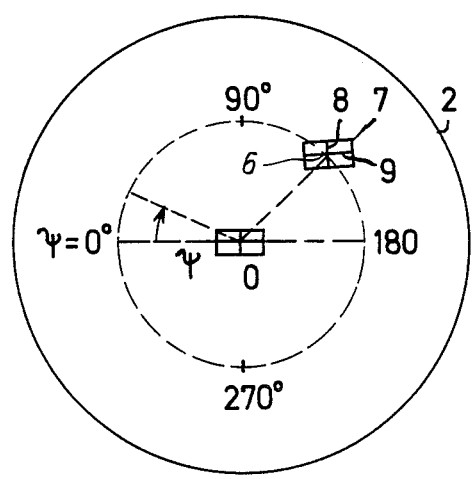
FIG. 2 is a view in front elevation of the spectacle lens of FIG. 1, i.e. as seen from the object side to define and illustrate a lens-surface point location in terms of the polar-component angle $\Psi$.

The shape of the eye-side surface 4 is determined at each point by its two principal curvatures and by the principal curvature-directions. FIGS. 1 and 2 serve to explain this. At the intersection point 6 of the viewing line 5 with surface 4, a tangential plane 7 has been entered in the drawing. In each section perpendicular to this tangential plane and through point 6, the surface 4 has a certain curvature. The strongest and weakest curvatures are termed the principal curvatures. The corresponding directions 8 and 9 are the principal curvature-directions.

Figure 3:
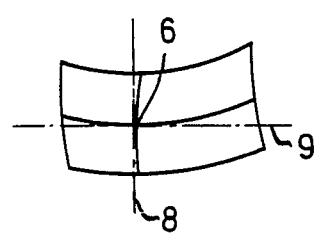
FIG. 3 is an enlarged view of an elemental surface area in the vicinity of the intersection point shown in FIG. 1.

On a larger scale, FIG. 3 shows elemental lens-surface area local to the intersection point 6, from which the principal curvatures become clear.

The curves of FIG. 4 refer to a known spectacle lens which is arranged in front of an eye and which serves to correct the ametropia of this eye. The surface 4 of this spectacle lens, i.e. the surface facing the eye, is toric. The selected spectacle-lens example has a spherical power of +4 dpt and a cylindrical power of +1 dpt. Such a lens therefore has a power of +5 dpt in one principal meridian and of +4 dpt in the other principal meridian. The course of the astigmatism shown is for an eye having a constant visual angle w=30° and rotating through one quadrant, from the horizontal ($\Psi=0°$) up to the vertical ($\Psi=90°$). This one-quadrant display will be understood to show that the same relationships result for reasons of symmetry in the other three quadrants.

In FIG. 4, curve 10 shows the astigmatism course of the spectacle lens alone. It can be seen that astigmatism becomes zero at about $\Psi=23°$, but reaches values of up to about 0.5 dpt in other angular ranges. The curve 11 shows the residual astigmatism of the spectacle lens-/eye-system. For the example given, it can be seen that, at $\Psi=23°$, a residual astigmatism of more than 0.2 dpt remains for this system. With larger values of the visual angle w and with stronger spectacle lenses; the phenomenon represented by the curve 11 becomes still more pronounced.

The curve 12 of FIG. 5 shows the reason for the different course of curves 10 and 11 of FIG. 4. In the example shown, it has been assumed that the eye, with zero direction of view (i.e. upon viewing through the center point 0 in FIG. 2), has an astigmatism axis of 180°. If the eye now moves on the vision cone w=30°, from the horizontal ($\Psi=0°$) to the vertical ($\Psi=90°$), then said astigmatism axis assumes the angular positions designated $\phi_A$, tabulated below, all angles being given in degrees. In this connection, the angle $\phi_A$ is defined in a plane perpendicular to the corresponding viewing line, for example, the viewing line 5 in FIG. 1, as the angle between the horizontal line and the axis of the astigmatism. A corresponding definition applies to the angle $\phi_G$ which designates the axial orientation of the cylindrical power of the spectacle lens of FIG. 4.

| $\Psi$ | $\phi_A$ | $\phi_G$ |
|---|---|---|
| 0 | 180.0 | 180.0 |
| 10 | 178.7 | 180.7 |
| 20 | 177.5 | 181.3 |
| 30 | 176.6 | 182.0 |
| 40 | 176.0 | 182.5 |
| 50 | 175.9 | 183.3 |
| 60 | 176.3 | 183.3 |
| 70 | 177.2 | 182.8 |
| 80 | 178.5 | 181.5 |
| 90 | 180.0 | 180.0 |

Curve 12 in FIG. 5 uses the tabulated data to show the difference $\phi_G - \phi_A$, as a function of angular position $\Psi$ on the viewing cone w=30°.

FIG. 6 shows astigmatism for each of several spectacle-lens/eye systems, for the range $\Psi=0°$ to $\Psi=90°$, and on the same visual angle cone w=30°, but for the more severe case of stronger lens correction, wherein the lens 2 has a spherical power of +6 dpt and a cylindrical power of +4 dpt. The curve 13 applies for a spectacle lens having an inner toric surface, i.e. a spectacle lens of the character of FIG. 1. The curve 14 shows somewhat better results, obtained when the spectacle lens is developed with an outer toric surface. Such a spectacle lens, however, is in no way aesthetically pleasing.

One might think, in the case of a spectacle lens having a spherical surface and a toric surface, of replacing the spherical surface by an aspherical surface having rotational symmetry. The result is shown by curve 15, where the error level is seen to remain substantially the same as in the other cases. The only effect achieved is that the variations in astigmatic error between the individual meridian sections are smaller.

The spectacle lens 20 (FIG. 7) of the present invention has now, instead of a toric surface, a surface deformed in accordance with the invention; such a deformed surface can properly be referred to as an atoric surface. This lens has the effect that residual astigmatism of the spectacle lens/eye-system drops to values close to zero, as shown by curve 16 in FIG. 6. The very small magnitude of the residual astigmatism is found to satisfy the quality formula stated above.

FIG. 8 shows a half-section lens-surface profile at the principal meridian of lens 20 having the dioptric powers indicated and being the same as in FIG. 6. The dioptric power at said principal meridian amounts to +10 dpt. To generate the profile curves of FIG. 8, a vertical tangential plane is applied at the point 0 to the atoric surface and then one cuts perpendicular thereto through the horizontal principal meridian. The resultant intersection with the atoric surface follows the curve 17. In this connection, y indicates the saggita of the intersection curve 17, with respect to said vertical tangential plane.

The curve 17 differs from a circular profile which, for the 10:1 exaggerated emphasis of FIG. 8, is given by curve 18. Neither can the curve 17 be attributed to a conical section, in that the conical section which comes closest to the curve 17 extends in a manner corresponding to curve 19. All other conceivable conical sections lie between the curve 19 and the x-axis.

The spectacle lens 20 of the invention is imparted a bending which can be selected in accordance with cosmetic and/or grinding or manufacturing factors since as previously mentioned the quality of correction of the lens is not dependent on said bending.

In FIG. 9 various power considerations are displayed for the inventive lens having properties depicted at 16 in FIG. 6 and at 17 in FIG. 8. The presentation is only for the upper-right quadrant, in view of above-noted symmetry in the involved single lens. In each charted situation, values are given for a grid of points extending in 4 mm increments vertically and horizontally. For the aspheric surface alone i.e. for eye-side surface 4 (column a), separate plots are provided for power distribution due to surface astigmatism, and to average power, as well as astigmatism-axis orientation, all plots being taken over the optimized surface. For the complete spectacle lens (column b), corresponding plots are given for optical power distribution, for average power and for axis orientation, it being noted that powers expressed for the complete spectacle lens are powers that are effective at the corneal vertex of the eye. For the lens/eye combination (column c), residual (error) powers are separately expressed in terms of astigmatic and average power, it being noted that for the situation of FIG. 9, astigmatic error has been reduced to substantial zero throughout for all viewing directions, and it being further noted that all values of residual average are well within the focal-accomodation capability of most people.

In FIG. 10, the aspheric surface, the complete lens, and the lens/eye combination are presented in the manner discussed above for FIG. 9, except that FIG. 10 serves to illustrate that for those persons who have little or no focal-accommodation capability, the residual astigmatism (upper chart of column c) may be tolerated to greater extents (even though still substantially zero) in order that average-power distribution (lower chart of column c) may be within the lesser focal-accommodation capabilities of such persons.

In both examples of FIGS. 9 and 10 the complete lens (column b) has a maximum thickness of 9.0 mm, the index of refraction (n) is 1.501, and the constant spherical outer surface 3 has the radius $R_1 = 48.65$ mm.

What is claimed is:

1. A spectacle lens of astigmatic power which has at least one lens surface of other than spherical or toric form, characterized by the fact that (a) for every region of viewing-axis incidence with said lens surface the principal curvatures and the principal curvature-directions are such that the astigmatism of the spectacle lens and of the eye to be corrected are individually corrected and adapted to each other as to direction and extent, and (b) that said lens surface is twice continuously differentiable at each point.

2. A spectacle lens according to claim 1, characterized by the fact that the residual astigmatism of the lens/eye-system for all visual angles $w = 10°$ up to the edge of the lens for all positions of the lines of view characterized by the angle $\Psi$ on the vision cone $w =$ constant between 0° and 360° satisfies the following quality relationship:

$$|\text{residual astigmatism } (w, \Psi)| \leq (0.125 + 0.00025 \times w^2) \times$$
$$\min(1; 2z/3) \times (1 + |s|)/8.75$$

where:
- w is the visual angle, in degrees, calculated from the central axis of the spectacle lens;
- z is the cylinder effect in diopters; and
- s is the spherical equivalent $$\left(\text{i.e. sphere} + \frac{\text{cylinder}}{2}\right);$$

the factor min (1; 2z/3) means that, in each case, corresponding to the value of z, the smallest value of this factor is to be inserted.

3. A spectacle lens according to claim 1, characterized by the fact that at least a part of the front or rear surface of a single-focus or multi-focus lens is developed as the deformed-lens surface.

4. A spectacle lens according to claim 1, characterized by the fact that the deformed-lens surface is developed as a fusion surface of a multi-focus lens.

5. A spectacle lens according to claim 1, characterized by the fact that the deformed-lens surface is developed as at least part of the front or rear surface of a progressive lens.

6. A spectacle lens according to claim 1, characterized by the fact that the lens bending is selected in accordance with cosmetic factors and/or factors of grinding or manufacturing technique.

7. The spectacle lens of claim 1, wherein the lens material is glass and said one lens surface is a machined surface.

8. The spectacle lens of claim 1, wherein the lens material is organic and said one lens surface is a molded surface.

9. As an article of manufacture, for astigmatic correction of an eye for which the distribution of astigmatic power has been ascertained at each of a plurality of viewing-axis angles throughout the range of viewing-axis capability of the eye, a spectacle lens having a first surface of other than spherical or toric form and a second surface, both surfaces determining the optical power of the spectacle lens, said lens being characterized by the fact that for every region of viewing-axis incidence with said lens the local power of said first lens surface (principal curvatures and principal curvature-directions) in its coaction with said second lens surface is substantially equal in magnitude but of sign opposite to the ascertained astigmatic power of the eye at the correspondingly localized viewing-axis of the eye.

10. The method of embodying astigmatic correction in a spectacle lens having a first surface of other than spherical or toric form and a second surface, both surfaces determining the optical power of the spectacle lens, which method comprises ascertaining the distribution of astigmatism for each viewing-axis angle of a particular eye to be corrected, individually calculating data as to principal curvature and as to principal-curvature direction for at least one point in every region of viewing-axis incidence with said first lens surface, said data for each point being such that the astigmatism of the spectacle lens and of the eye to be corrected are individually corrected and adapted to each other at each said point as to direction and extent, calculation a deformation of said first surface in such manner as to satisfy said data for each said point, the thus-calculated surface being twice continuously differentiable at each point in the surface, and then generating said calculated surface in a machining operation.

11. The method of embodying astigmatic correction in a spectacle lens having an outer surface and an inner surface, the correction being to reduce to substantially zero the residual astigmatism of the combination of this lens and a particular astigmatic eye for which lens correction is required, which method comprises individually calculating data as to principal curvature and as to principal curvature direction for at least one point in every region of viewing-axis incidence with said inner surface, said individual data calculation in each case including consideration of (a) a first astigmatism component due to oblique incidence of related incoming light on the outer surface, (b) a second astigmatism component due to oblique incidence of light transmitted through the lens and emergent from the inner surface in the viewing-axis direction, and (c) a third astigmatism component due to the local cylindrical component of curvature in at least one of said surfaces, said data for each point being such that the sum of astigmatism components is substantially equal in magnitude but opposite in sign with respect to the particular astigmatism of the eye, calculating a deformation of said at least one surface in such manner as to satisfy said data for each said point, the thus-calculated surface being twice continuously differentiable at each point in the surface, and then generating said calculated surface in a machining operation.

12. The method of claim 11, wherein reduction to substantially zero is within limits set forth in the relationship that the residual astigmatism of the lens/eye system for all visual angles $w = 10°$ up to the edge of the lens for all positions of the lines of view characterized by the angle $\Psi$ on the vision cone $w = $ constant between 0° and 360° satisfies the following quality relationship:

$$|\text{residual astigmatism}(\underline{w}, \Psi)| \leq (0.125 + 0.00025 \times w^2) \times$$
$$\min(1; 2\underline{z}/3) \times (1 + |s|)/8.75$$

where:
  w is the visual angle, in degrees, calculated from the central axis of the spectacle lens;
  z is the cylinder effect in diopters; and
  s is the spherical equivalent $$\left(\text{i.e. sphere} + \frac{\text{cylinder}}{2}\right);$$

the factor $\min(1; 2z/3)$ means that, in each case, corresponding to the value of z, the smallest value of this factor is to be inserted.

13. The method of claim 11, in which said data calculation in each case includes (d) the astigmatic-axis orientation shift of the eye pursuant to Listing's rule.

* * * * *